(12) United States Patent
Vermeir

(10) Patent No.: US 10,552,876 B2
(45) Date of Patent: Feb. 4, 2020

(54) METHOD AND APPARATUS FOR CHROMA RECONSTRUCTION

(71) Applicant: BARCO N.V., Kortrijk (BE)

(72) Inventor: Thijs Vermeir, Staden (BE)

(73) Assignee: BARCO N.V., Kortrijk (BE)

( * ) Notice: Subject to any disclaimer, the term of this patent is extended or adjusted under 35 U.S.C. 154(b) by 259 days.

(21) Appl. No.: 15/539,521

(22) PCT Filed: Jan. 15, 2016

(86) PCT No.: PCT/EP2016/050775
§ 371 (c)(1),
(2) Date: Jun. 23, 2017

(87) PCT Pub. No.: WO2016/113396
PCT Pub. Date: Jul. 21, 2016

(65) Prior Publication Data
US 2017/0352062 A1 Dec. 7, 2017

(30) Foreign Application Priority Data
Jan. 15, 2015 (GB) .................................. 1500719.8

(51) Int. Cl.
*H04N 19/00* (2014.01)
*G06Q 30/02* (2012.01)
(Continued)

(52) U.S. Cl.
CPC ..... *G06Q 30/0272* (2013.01); *G06F 3/04842* (2013.01); *G06F 17/18* (2013.01);
(Continued)

(58) Field of Classification Search
CPC .. G06Q 30/0272; G06Q 50/01; H04N 19/105; H04N 19/117; H04N 19/186;
(Continued)

(56) References Cited

U.S. PATENT DOCUMENTS

| 9,338,470 B2 * | 5/2016 | Su ........................... H04N 19/46 |
| 2006/0268991 A1 * | 11/2006 | Segall ...................... H04B 1/66 |
| | | 375/240.24 |

(Continued)

FOREIGN PATENT DOCUMENTS

| CN | 101513053 A | 8/2009 |
| CN | 102132563 A | 7/2011 |

(Continued)

OTHER PUBLICATIONS

Chinese Office Action in related Chinese Application No. 201680006025.X, dated Nov. 5, 2018.

(Continued)

*Primary Examiner* — Sean T Motsinger
(74) *Attorney, Agent, or Firm* — Bacon & Thomas, PLLC

(57) ABSTRACT

A method and apparatus for predicting chroma values including the steps of having a decoder provide an image frame to an up-sample filter, the image frame having luma and chroma components, and applying an analysing algorithm on a subset of said image frame to obtain the subset content type, and, depending on the content type, select a reconstruction algorithm to reconstruct the chroma components.

20 Claims, 4 Drawing Sheets

(51) Int. Cl.
*H04N 19/50* (2014.01)
*H04N 19/105* (2014.01)
*H04N 9/64* (2006.01)
*H04N 19/186* (2014.01)
*H04N 19/59* (2014.01)
*H04N 19/85* (2014.01)
*H04N 19/117* (2014.01)
*G06F 3/0484* (2013.01)
*G06F 17/18* (2006.01)
*G06Q 50/00* (2012.01)

(52) U.S. Cl.
CPC ............ *G06Q 50/01* (2013.01); *H04N 9/646* (2013.01); *H04N 19/105* (2014.11); *H04N 19/117* (2014.11); *H04N 19/186* (2014.11); *H04N 19/50* (2014.11); *H04N 19/59* (2014.11); *H04N 19/85* (2014.11)

(58) Field of Classification Search
CPC ........ H04N 19/50; H04N 19/59; H04N 19/85; H04N 9/646; G06F 3/04842; G06F 17/18
See application file for complete search history.

(56) References Cited

U.S. PATENT DOCUMENTS

| | | | |
|---|---|---|---|
| 2007/0253489 A1* | 11/2007 | Chao | H04N 5/144 375/240.21 |
| 2008/0036792 A1 | 2/2008 | Liang et al. | |
| 2009/0324079 A1* | 12/2009 | Yuan | G06K 9/325 382/176 |
| 2010/0214472 A1 | 8/2010 | Tomonaga | |
| 2011/0181778 A1 | 7/2011 | Komaki | |
| 2011/0255608 A1* | 10/2011 | Kim | H04N 19/186 375/240.25 |
| 2013/0039430 A1* | 2/2013 | Su | H04N 19/46 375/240.25 |
| 2014/0092999 A1* | 4/2014 | Dong | H04N 19/70 375/240.29 |
| 2014/0369402 A1* | 12/2014 | Minoo | H04N 19/117 375/240.02 |
| 2015/0016720 A1* | 1/2015 | Vermeir | G06T 5/20 382/166 |
| 2015/0189298 A1* | 7/2015 | Ye | H04N 19/196 375/240.02 |
| 2015/0189329 A1* | 7/2015 | Wada | H04N 19/59 382/199 |
| 2016/0048952 A1* | 2/2016 | Tezaur | G06T 5/004 382/255 |
| 2017/0085878 A1* | 3/2017 | Sole Rojals | H04N 19/124 |
| 2017/0116708 A1* | 4/2017 | Imber | G06T 3/4007 |
| 2017/0127068 A1* | 5/2017 | Lapicque | G06T 3/4053 |
| 2017/0127085 A1* | 5/2017 | Sun | H04N 19/149 |
| 2017/0352062 A1* | 12/2017 | Vermeir | H04N 9/646 |

FOREIGN PATENT DOCUMENTS

| | | |
|---|---|---|
| CN | 102792698 A | 11/2012 |
| CN | 102957912 A | 3/2013 |
| CN | 103202016 A | 7/2013 |
| CN | 103650512 A | 3/2014 |
| EP | 2495963 A2 | 9/2012 |
| GB | 2516110 A | 1/2015 |
| WO | 2014055310 A1 | 4/2014 |
| WO | 2015/066525 A1 | 5/2015 |

OTHER PUBLICATIONS

International Search Report (ISR) dated Mar. 15, 2016, for PCT/EP2016/050775.
Written Opinion dated Mar. 15, 2016, for PCT/EP2016/050775.
British Search Report dated Jul. 10, 2015, for GB 1500719.8.
Apple, "Apple—ipad air—technical specifications," https://www.apple.com/ipad-air/specs/, 2014, [Online; accessed Aug. 19, 2014].
Google, "Supported media formats, android developers," http://developer.android.com/guide/appendix/media-formats.html, 2014, [Online; accessed Aug. 19, 2014].
G. J. Sullivan, J.-R. Ohm, W.-J. Han, and T. Wiegand, "Overview of the high efficiency video coding (HEVC) standard," Circuits and Systems for Video Technology, IEEE Transactions on, vol. 22, No. 12, pp. 1649-1668, 2012.
Y. Itoh and T. Ono, "Up-sampling of YCbCr 4:2:0 image exploiting inter-color correlation in rgb domain," Consumer Electronics, IEEE Transactions on, vol. 55, No. 4, pp. 2204-2210, Nov. 2009.
M. Zhao, P. M. Hofman, and G. de Haan, "Content-adaptive up-scaling of chrominance using classification of luminance and chrominance data," in Electronic Imaging 2004. International Society for Optics and Photonics, 2004, pp. 721-730.
K. He, J. Sun, and X. Tang, "Guided image filtering," IEEE Transactions on Pattern Analysis and Machine Intelligence, vol. 35, No. 6, pp. 1397-1409, 2013.
Zhou Wang, A.C. Bovik, H.R. Sheikh, and E.P. Simoncelli, "Image quality assessment: from error visibility to structural similarity," Image Processing, IEEE Transactions on, vol. 13, No. 4, pp. 600-612, Apr. 2004.
Vermei R (Barco) T et al: "AhG8: Guided Image Filtering for Screen Content Coding", 14. JCT-VC Meeting; Jul. 25, 2013-Aug. 2, 2013, Vienna; (Joint Collaborative Team on Video Coding of ISO/I EC JTC1/SC29/WG11 and ITU-T SG.16 ); URL: http://wftp3.itu.int/av-arch/jctvc-site/, No. JCTVC-N0148-v2, Jul. 25, 2013.
Chen J et al: "CE6.a.4: Chroma intra prediction by reconstructed luma samples", Mar. 12, 2011, No. JCTVC-E266, Mar. 12, 2011.
Kawamura K et al: Chroma intra prediction based on residual luma samples 11 , 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.itu.int/av-arch/jctvc-site/, No. JCTVC-F095, Jul. 14, 2011.
Wei Pu et al: "Non-RCE1: Inter Color Component Residual Prediction", Joint Collaborative Team on Video Coding (JCT-VC) of ITU-T SG 16 WP 3 and ISO/IEC JTC 1/SC 29/WG 11; 14th JVT-VC Meeting; Jul. 25, 2013-Aug. 1, 2013; Vienna, No. JCTVC-N0266-v5, Jul. 28, 2013.
Chinese Office Action in related Chinese Application No. 201680006025.X, dated Jul. 2, 2019.
European Office Action in related European Application No. 167019112-1208, dated Sep. 24, 2019.

* cited by examiner $$L = \begin{bmatrix} 80 & 80 & 80 \\ 80 & 75 & 75 \\ 80 & 70 & 70 \\ 80 & 65 & 65 \\ 80 & 60 & 60 \\ 80 & 60 & 50 \end{bmatrix} \quad C = \begin{bmatrix} 100 & 115 \\ 100 & 134 \end{bmatrix} \quad R = \begin{bmatrix} 100 & 100 & 100 \\ 100 & 110 & 110 \\ 100 & 120 & 120 \\ 100 & 130 & 130 \\ 100 & 140 & 140 \\ 100 & 140 & 160 \end{bmatrix}$$

(a)   (b)

METHOD AND APPARATUS FOR CHROMA RECONSTRUCTION

The present invention relates to a method and apparatus for chroma reconstruction as well as a computer program product for executing the method.

BACKGROUND OF THE INVENTION

In many professional applications, a large number of video sources need to be visualized on a video wall to provide an overview of the situation. Some examples include video surveillance, complex industrial processes (e.g., oil refinery, power plant), or networks (e.g., electricity networks). In the past, due to high requirements towards delay and quality, such professional visualization systems were often implemented using dedicated hardware and networks. However, there is a growing need to incorporate off-the-shelf consumer level hardware to reduce cost, and/or increase functionality by enabling video content sharing from the video wall/control room to and from any network and device.

In chroma sub-sampling, the encoding for the color information, chroma, can be made with less resolution than that of the brightness information, luma. This method takes advantage of the fact that the perception of the human eye is less sensitive to colour differences than for differences in brightness. The notation can be YUV, where Y represents the luma/brightness component, and U and V represents the chroma/colour components. For example, for 8 bits per component, the full resolution would be 4:4:4 while 4:2:0 has reduced colour information, the latter requiring less data storage and/or bandwidth.

The video content visualized in an environment requiring high resolution, such as e.g. a control room, can comprise a combination of "natural" video from cameras and synthetic content such as graphs, maps, spread sheets, etc. Applications with synthetic content typically require very high quality. FIG. 1 illustrates the case when a YUV 4:2:0 chroma sub-sampling is implemented for synthetic screen content in the form of the word "dec". FIG. 1a) shows the original where a part of the letter "d" with the same colour and brightness is marked with a striped pattern. FIG. 1b) shows the reconstructed image where colour and brightness of the corresponding part of the "d" has changed into a multiple of different levels, each level is indicated with a different pattern. FIG. 1c) shows the original images so that the left image of 1c) corresponds to 1a) and right imaged of 1c) corresponds to 1b).

Dedicated hardware for efficient hardware-accelerated video coding is typically available for YUV 4:2:0 profiles [1] [2]. The first version of the High Efficiency Video Coding (HEVC) [3] compression standard supports YUV 4:2:0 sub-sampling. Together these tools can yield an efficient and cheap solution for YUV 4:2:0 sub-sampling.

Hardware accelerated video coding for YUV 4:4:4 profiles are however not yet available. Thus, the support for YUV 4:4:4 sub-sampling has to be provided with non-accelerated hardware together with less efficient- and power consuming software. Further, due to the low demand, YUV 4:4:4 enabled hardware- and software implementations are expensive compared to implementations only supporting YUV 4:2:0 profiles.

Existing adaptive up-sampling techniques that use inter-component correlation between luma and chroma are proposed in [4] and [5]. These techniques are designed for natural content and do not take the specific characteristics of screen content into account (e.g. sharp discontinuous edges, homogeneous colours in nearby pixels).

The guided image filter introduced by He et al. in [6] is an edge preserving smoothing filter. Applications of this technique can be for example edge-aware smoothing, detail enhancement and HDR compression. Patent application GB2516110A discloses a method based on guided image filtering where the luma component is used as the guidance image to reconstruct the chroma components. The method depends on the covariance between the two. The guided image filter is able to transfer sharp edges from the luma component to the chroma component. When no covariance can be detected, however, the filter will merely smooth the chroma component. This is a good property for natural content, but it can introduce unwanted artifacts for synthetic screen content. FIG. 2 shows a) the input, being synthetic screen content, to a guided chroma reconstruction filter, b) the output from the same filter and c) the original input. The striped pattern in a) and b) indicates fields that are gradient-free, i.e. each striped field has the same colour and intensity. It can be seen that this field in the output image b) is decreased, thus the amount of gradient has increased which causes the edge to look less sharp.

In patent application GB2516110A the outcome can be optimized by providing additional information in the encoded stream. Also information on how to reduce the above mentioned artifacts could be included in the stream. But adding this information to the stream leads to an increased use of bandwidth.

US 2010/214472 (Tomonaga) discloses a method for improved upscaling of a graphics image (e.g. from SD to HD). Graphics content has sharper edges as natural content in the luma components. As common upscaling filters are designed for natural content, these filters will introduce new artifacts around the edges of graphics content. This introduces image degradation. By analyzing the luma histogram, the noise is detected and removed around the peaks. A luminance histogram detector is required.

EP 2 495 963 A2 (Toshiba) discloses a method for automatic conversion of video signals by detecting their type. Conversion is only done when the correct format is not present in the video signal. Video is converted to another format having the number of colour sampling points smaller than that of the correct format.

US 2008/0036792 A1 (Qualcomm) discloses an improved upsampling method by looking at the symmetry and intensity of neighboring pixels in the image. The intensity is used to adapt the variant of an interpolation filter.

US 2009/0324079 A1 (Yuan) discloses a method for using multiple filters for natural and graphics content in a single frame. It also uses motion vector information to share the context between multiple frames.

US 2011/0181778 A1 (Komaki) discloses a method for up sampling a video signal of film material while reducing the noise.

SUMMARY OF THE INVENTION

The present invention seeks to provide a method and an apparatus for reconstruction of sub-sampled synthetic screen content. Optionally, accelerated hardware can be used.

In one embodiment of the invention there is provided a method for predicting chroma values with the use of a decoder, that could be a hardware accelerated decoder, and an up-sample filter, the method comprising the steps of having the decoder providing an image frame to the up-sample filter, said image frame comprising luma and chroma components, having the up-sampling filter defining a subset of said image frame, and applying at least one analysing algorithm on said subset to obtain the subset content type, and selecting at least one reconstruction algorithm to reconstruct the chroma components of the subset, for example by using the values of the luma components, wherein the selection of the at least one reconstruction algorithm depends on the subset content type. Since the content type is obtained, a reconstruction algorithm can be selected to suit that content type. The algorithm does not need to handle a multiple of content types simultaneously so the reconstruction can be made very efficient.

In this method an analyzing algorithm and/or a reconstruction algorithm detect if the luma component can be used as a guide for reconstructing the chroma component.

In another embodiment of the invention there is provided a method for chroma prediction according to the above wherein an analysing algorithm comprises the step of investigating if at least two luma components in the above mentioned subset have the same value. If this is the case, the corresponding chroma components (having the same coordinates as the luma components) are set equal to each other. The chroma values can then be reconstructed by using an up-sampling filter. This method can identify content where many components have the same value, e.g. synthetic screen content. A dedicated reconstruction algorithm can then be selected in order to increase efficiency.

In another embodiment of the present invention there is provided a method for chroma prediction according to the above wherein an analysing algorithm comprises the step of investigating if the chroma subset has substantially the same structure, or substantially the inverse structure, of the luma subset. If this is the case, it is possible to reconstruct the chroma values by normalizing the full-resolution luma component with the minimum and maximum sub-sampled luma component, and linearly scale it to the sub-sampled chroma component. This method can be used if there are not sufficient neighbouring luma components having the same value, e.g. if there is a gradient present. A dedicated reconstruction algorithm can then be selected in order to increase efficiency.

In another embodiment of the present invention there is provided a method according to the above wherein the smallest size of the subset is 2 by 2 pixels in full chroma resolution. The subset can be is repeatedly moved so that eventually the whole frame is being analysed and reconstructed.

In another embodiment of the present invention there is provided an apparatus for predicting chroma values, comprising a decoder arranged to receive and provide an image frame, said image frame comprising luma and chroma components, and an up-sampling unit, comprising an up-sampling filter performing reconstruction, arranged to receive image frames from the decoder, wherein for each subset of the image frame the selected reconstruction algorithm depends on the content type of the subset.

This apparatus is adapted so that an analyzing algorithm and a reconstruction algorithm detects if the luma component can be used as a guide for reconstructing the chroma component. For this detection a moving window is used and also at least two components (luma and chroma).

In another embodiment of the present invention there is provided a computer program product comprising a machine-readable medium carrying instructions which, when executed by a processor, cause the processor to perform any of the above the methods.

DETAILED DESCRIPTION OF THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein. The term "comprising", used in the claims, should not be interpreted as being restricted to the means listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the description or claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

Embodiments of the present invention seek to provide a method and apparatus for reconstruction of sub-sampled synthetic screen content, optionally using accelerated hardware. The examples given in the following text are provided for illustration and should not be seen as limiting.

Figure 1:
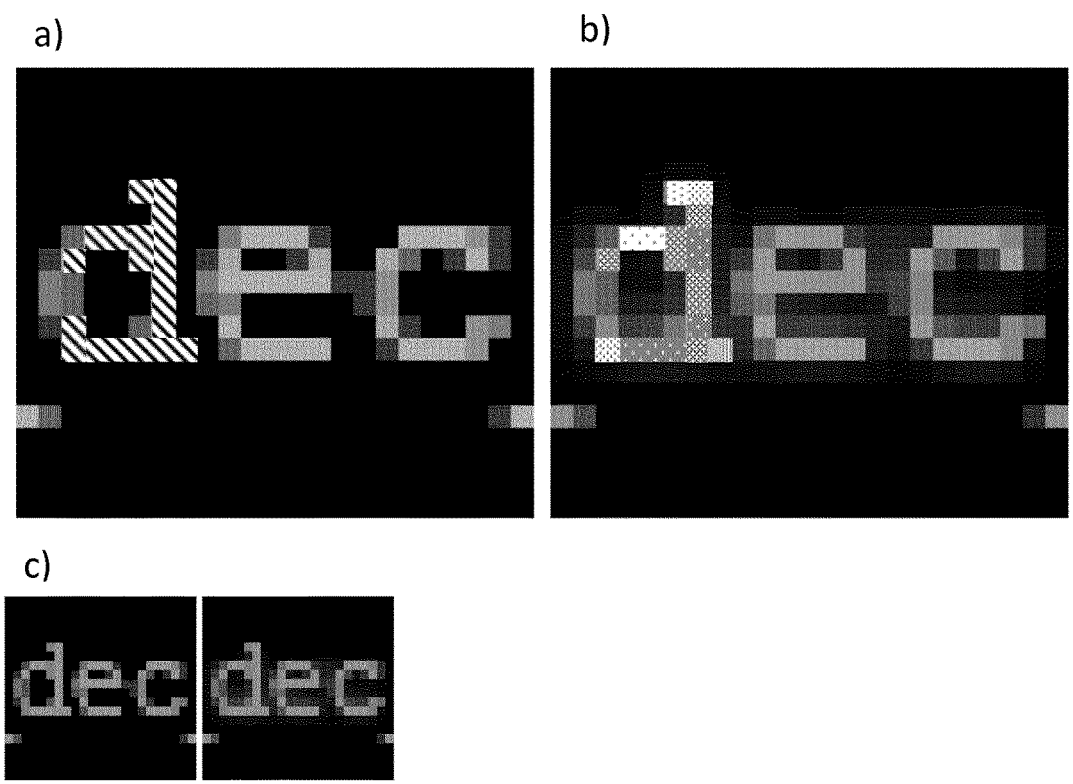
FIG. 1 shows an example of reconstructed synthetic screen content where poor quality is visible.
Figure 2:
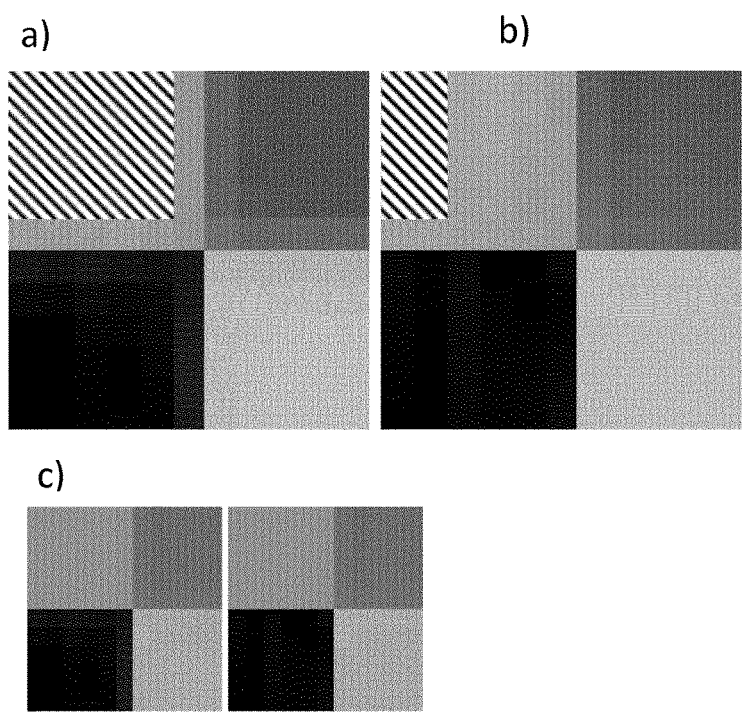
FIG. 2 shows an example of how a guided filter smooth around an edge in the image.
Figure 3:
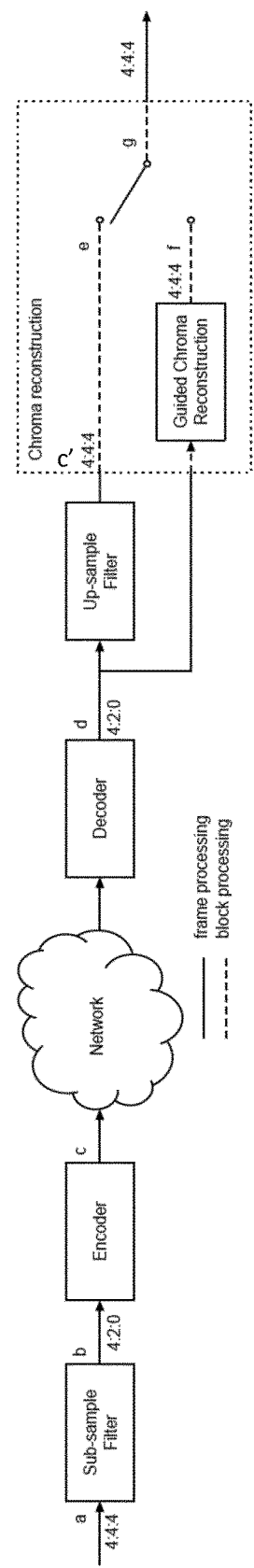
FIG. 3 shows an overview of an embodiment of the present invention where.

FIG. 3 shows an embodiment of the present invention. The proposed method for reconstructing the chroma component can be designed to be used after the decoder without modifications to the encoder. The original stream a can be captured, for example, through screen capturing and converted to a YUV 4:4:4 video stream if necessary. In order to enable the use of conventional encoders, this stream can be sub-sampled as stream b by the sub-sample filter in the encoder device. The encoder can then encode streams with a YUV 4:2:0 sub-sample profile, like the HEVC/H.265 Main profile. It is not necessary to include any additional information in the encoded video stream c. After transmission over the network, the video stream c' can be decoded by a standard compliant (e.g. optionally hardware accelerated) decoder. This can generate the video stream d that can be used as the input for the chroma reconstruction. In FIG. 3, a step with a solid line pertains to frame processing while the striped line refers to block processing.

FIG. 4a) illustrates a sliding input window 3 covering 6×3 luma pixels 1 (only 3 pixels are indicated) and 2×2 sub-sampled chroma pixels 2 (only 2 pixels are indicated). The output window 4 comprises 4 luma pixels 1 (only 1 pixel is indicated) on full resolution. FIG. 4b) illustrates the sliding input window as matrices. The input matrix L represents the luma components $l_{i,j}$, the matrix R represents the sub-sampled chroma components $r_{i,j}$, and the matrix C represents the (unknown) full resolution chroma component $C_{i,j}$.

The chroma reconstruction algorithm of the present invention can be based on the sub-sample filter of the encoding device and the chroma pixel positions. The algorithm can also be adapted to other sub-sample filters and/or chroma pixel positions. For the chroma reconstruction, every frame can be analyzed with a sliding input window 3 that can move independently in any direction. A large window size has a lower probability for cross component correlation. The minimum sliding input window 3 should at least have 2×2 pixels in the sub-sampled chroma component. To define the matching sliding input window in the luma component, the filter and chroma pixel position should be taken into account. As the four-taps filter uses four positions, e.g. $r_{0,0}$, $r_{1,0}$, $r_{2,0}$ and $r_{3,0}$ for the output $c_{0,0}$, the window size of the full resolution components can be 6 by 3 pixels. Every window has four output pixels $r_{2,1}$, $r_{2,2}$, $r_{3,1}$ and $r_{3,2}$.

To decide if the pixels represent synthetic screen content, each frame can be analyzed by sliding the window over the frame and evaluate the pixels in two steps. This can be repeated until all pixels in the frame have been analyzed. Preferably, the sliding input window is always the same size, it does not change. In this method an analyzing algorithm and the reconstruction algorithm detect if the luma component can be used as a guide for reconstructing the chroma component. For this detection a moving window is used and also at least two components (e.g. luma and chroma).

Step 1:

The first step investigates if the following is true: If two pixels have the same luma value, it's also highly probable that they also have the same chroma value.

$$l_{n,m}=l_{i,j} \Rightarrow +r_{n,m}=r_{i,j} \ (n,m)\in W, (i,j)\in W. \quad (1)$$

This step yields a positive outcome for screen content, since a lot of pixels with homogeneous colors can be situated in the sliding window.

TABLE I

| Sequence | P(L) [%] | P(C\|L) [%] |
|---|---|---|
| cad-waveform | 90.32 | 99.83 |
| pcb-layout | 97.14 | 100 |
| ppt-doc | 84.66 | 99.12 |
| twist-tunnel | 83.83 | 99.46 |
| video-conferencing | 81.62 | 96.35 |
| Average | 87.51 | 98.95 |
| BirdsInCage | 8.86 | 1.69 |
| crowdRun | 0.06 | 0.00 |
| Kimono | 2.42 | 0.52 |
| ParkScene | 0.26 | 16.25| |
| Traffic | 6.01 | 2.52 |
| Average | 3.52 | 4.20 |

Table I shows the probability P(L) of pixels for which the part $l_{m,n}=l_{m,n}$ in equation 1 is true, i.e., the pixels at (i,j) and (m,n) in the window have the same luma value. The P(C/L) is the probability of pixels for which equation 1 as a whole is true, i.e. the pixels at (i,j) and (m,n) has the same luma value and the same chroma value. The upper half of the table comprises synthetic screen content and the lower half of the table comprises natural screen content. It can be seen that the values of both P(L) and P(C/L) for the synthetic screen content are very high while they are very low for the natural content. Thus, synthetic screen content can be identified from natural screen content. To determine the reconstructed values, equation 1 can be combined with the formulas used in the encoder to subsample the chroma pixels so that equations (2) to (5) for the reconstructed chroma values $c_{i,j}$ are obtained:

$$c_{0,0} = \frac{-r_{0,0} + 9r_{1,0} + 9r_{2,0} - r_{3,0}}{16} + \delta_{0,0} \quad (2)$$

$$c_{0,1} = \frac{-r_{0,2} + 9r_{1,2} + 9r_{2,2} - r_{3,2}}{16} + \delta_{0,1} \quad (3)$$

$$c_{1,0} = \frac{-r_{2,0} + 9r_{3,0} + 9r_{4,0} - r_{5,0}}{16} + \delta_{1,0} \quad (4)$$

$$c_{1,1} = \frac{-r_{2,2} + 9r_{3,2} + 9r_{4,2} - r_{5,2}}{16} + \delta_{1,1} \quad (5)$$

The $\delta_{i,j}$ compensate for the rounding errors when converting $c_{i,j}$ to unsigned integer 8-bit values, and can be in the range [−0.5; 0.5]. Note that for a system like that in FIG. 3, optimal chroma reconstruction (taking place after the decoder) can be obtained if the up-sampling filter is of the same type as the sub-sampling filter that is used before the decoder.

The step 1 can only provide a solution when there are enough pixels with equal luma values, such that the formulas can be simplified and solved. Note that the pixels $r_{2,1}$ and $r_{3,1}$ are not taken into account for calculating the sub-sampled chroma pixel values. These pixels should have equal luma pixel values to a pixel from column 0 or 2. When, for example, a gradient is used (e.g. more colors in the sliding window), this assumption fails to resolve to a valid solution and the output of this assumption cannot be used. A second step is introduced that can provide a solution for these cases.

Step 2:

The second step investigates if the following is true: The chroma component has the same, or the inverse, structure as the luma component. The chroma component should also have a value between the minimum and maximum value of the luma component. When there is a similar structure between the chroma and luma components, the chroma component increases, or decreases for the inverse case, when the luma component increases.

Figures 4, 5:
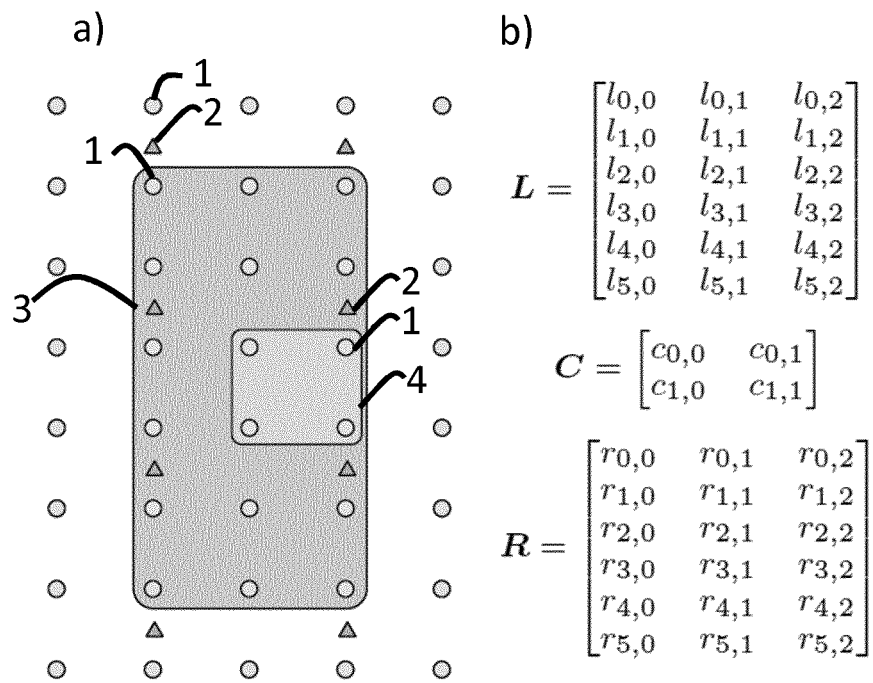
FIG. 4 shows an embodiment of the present invention in a) graphical form and in b) matrix form.
FIG. 5 shows an embodiment of the present invention with numerical values in the L, R and C matrices.

FIG. 5 illustrates an example with numerical values for the original chroma component, R, the (original) luma component, L and C, which is the sub-sampled version of the original chroma component R. The outcome of step 1 will be false since there are not enough pixels with equal luma values to solve equations (2) to (5). It can also be seen that the original chroma component R has the inverse texture as the luma component L. When there is no structure in D (i.e. max(D)=min(D)), the outcome of step 2 will be false and another conventional method would be used for the reconstruction.

First, a sub-sampled version D of the luma component L is calculated. This can be done in a similar fashion as the subsample filter used in the encoder according to the following:

$$d_{0,0} = \frac{-l_{0,0} + 9l_{1,0} + 9l_{2,0} - l_{3,0}}{16} \quad (6)$$

$$d_{0,1} = \frac{-l_{0,2} + 9l_{1,2} + 9l_{2,2} - l_{3,2}}{16}$$

$$d_{1,0} = \frac{-l_{2,0} + 9l_{3,0} + 9l_{4,0} - l_{5,0}}{16}$$

$$d_{1,1} = \frac{-l_{2,2} + 9l_{3,2} + 9l_{4,2} - l_{5,2}}{16}$$

$$D = \begin{bmatrix} d_{0,0} & d_{0,1} \\ d_{1,0} & d_{1,1} \end{bmatrix} \left( \begin{bmatrix} 80 & 72.5 \\ 80 & 68.8125 \end{bmatrix} \right) \quad (7)$$

Expression 7 shows the numeric result of calculating D for the values in FIG. 5. The sub-sampled luma component D can then be normalized to $N_D$, between its minimum and maximum:

$$N_D = \frac{D - \min(D)}{\max(D) - \min(D)} \left( = \begin{bmatrix} 1 & 0.564 \\ 1 & 0 \end{bmatrix} \right) \quad (8)$$

Both D and ND can be calculated as floating points so there are no rounding errors. However, the chroma component C comprises integer values so the results can have rounding errors $\delta_{i,j}$. Therefore both extrema will be calculated for NC taking into account the possible rounding errors:

$$N_{C_{min}} = \frac{C - \min(C) - 1}{\max(C) - \min(C) - 1} \left( = \begin{bmatrix} -0.029 & 0.400 \\ -0.029 & 0.943 \end{bmatrix} \right) \quad (9)$$

$$N_{C_{max}} = \frac{C - \min(C) + 1}{\max(C) - \min(C) - 1} \left( = \begin{bmatrix} 0.030 & 0.485 \\ 0.030 & 1.061 \end{bmatrix} \right) \quad (10)$$

Step 2 will have a positive outcome if all elements from the normalized luma component are in the range of the elements of the normalized chroma component:

$$N_{C_{min_{i,j}}} \leq N_{D_{i,j}} \leq N_{C_{max_{i,j}}} (i, j) \in D \quad (11)$$

Note that this not true for the given example since 0.564 does not lie between 0.400 and 0.485.

Step 2 will have a positive outcome when the texture in both components is similar.

In case of a positive outcome of (13), the chroma component R' can be reconstructed as follows. The (full-resolution) luma component is normalized with the minimum and maximum of the sub-sampled luma component and linearly scaled to the sub-sampled chroma component:

$$N_L = \frac{L - \min(D)}{\max(D) - \min(D)} \quad (12)$$

$$R' = (N_L \cdot (\max(C) - \min(C))) + \min(C). \quad (13)$$

In case of a negative outcome of (13), the inverse normalization can also be tested:

$$N_D^{-1} = \frac{\max(D) - D}{\max(D) - \min(D)} \left( = \begin{bmatrix} 0 & 0.436 \\ 0 & 1 \end{bmatrix} \right) \quad (14)$$

$$N_{C_{min_{i,j}}} \leq N_{D_{i,j}}^{-1} \leq N_{C_{max_{i,j}}} (i, j) \in D \quad (15)$$

If this holds true (like in the numerical example) the luma structure can be inversely transferred to the up-sampled chroma component.

$$R' = \max(C) - (N_L \cdot (\max(C) - \min(C))) \quad (16)$$

$$\left( N_L = \begin{bmatrix} 1 & 1 & 1 \\ 1 & 0.709 & 0.709 \\ 1 & 0.418 & 0.418 \\ 1 & 0.127 & 0.127 \\ 1 & -0.164 & -0.164 \\ 1 & -0.164 & -0.745 \end{bmatrix} R' = \begin{bmatrix} 100 & 100 & 100 \\ 100 & 109.89 & 109.89 \\ 100 & 119.78 & 119.78 \\ 100 & 129.67 & 129.67 \\ 100 & 139.56 & 139.56 \\ 100 & 139.56 & 159.35 \end{bmatrix} \right) \quad (17)$$

If, in the example, R' is rounded, all pixels except $r'_{5,2}$ have the same reconstructed value as in the input R in FIG. 5. This deviation (159 instead of 160) is caused by the rounding errors in C. More important is the good texture reconstruction of the chroma component with the guidance of the luma component. The equations 13 and 17 will detect if the luma and chroma component do not share a similar texture. In this case a conventional up-sample filter without luma guidance will be used.

EXAMPLES

The proposed method is verified with different sequences used in the common test conditions of the HEVC range extensions. Two groups of test sequences are used, the first group are the screen content sequences: cad-waveform, pcblayout, ppt-doc, twist-tunnel and video-conference. The second group contains natural camera captured content: CrowdRun, Traffic, BirdsInCage, Kimono and ParkScene. The original sequences are YUV 4:4:4 sequences. For lossy compression the HM 16.2 reference codec ("HM 16.2" is a standard test model for the HEVC codec) with the Super High Tier (SHT) configuration with QP values 12, 17, 22 and 27 is used. "QP" is the Quantization Parameter which defines the coding quality (the lower the value, the higher the quality). There is no added value to use Main tier QP configurations as the quality degradation from the compression artifacts is not acceptable in the professional applications considered the scope in this paper.

The improvements in the chroma components are objectively measured using PSNR and Structural SIMilarity (SSIM) [7]. However, objective quality improvements are not always a clear indication for screen content. This is mainly because the PSNR is based on the Mean Square Error (MSE) of the full frame, while screen content artifacts are typically located around the sharp edges, which may be not homogeneously distributed over the entire frame. As a result, subjective quality gain can sometimes even be identified with small PSNR gains. SSIM tries to estimate the perceived error by assuming a strong dependency between pixels spatially close. It will, in this use case, provide a better objective quality metric. The improvements where subjectively verified and some visual examples will be provided.

Example: Lossless Compression

Table IIa provides the PSNR-chroma results for lossless compressed YUV 4:2:0 bit streams using standard HEVC/H.265 proposed chroma up-sampling as reference or "anchor". The outcome of using the method of the present invention is referred to as "proposal". For screen content, the improvements are in the range of 0.51 dB for the video-conferencing sequence up to 3.11 dB improvement for the cad-waveform sequence, with an average of 1.68 dB over all test sequences. The SSIM results for the same configuration can be found in Table IIb. These results show the same trend as the PSNR results. The cad-waveform sequence provides the best SSIM-chroma gain of 0.128, while an average SSIM-chroma gain of 0.051 is measured for the screen content sequences. While the sequences cad-waveform, pcb-layout, ppt-doc have very diverse SSIM results in the anchor version, in the proposed method they all provide a SSIM around 0.925.

The present invention relates to an apparatus for predicting chroma values with processing capability. The apparatus may include one or more microprocessors, processors, controllers, or central processing unit (CPU) and/or a Graphics Processing Unit (GPU), and can be adapted to carry out its respective functions by being programmed with software, i.e. one or more computer programmes. The apparatus may have memory (such as non-transitory computer readable medium, RAM and/or ROM), an operating system, optionally a display such as a fixed format display, data entry devices such as a keyboard, a pointer device such as a "mouse", serial or parallel ports to communicate other devices, network cards and connections to connect to any of the networks.

The software can be embodied in a computer program product adapted to carry out the following functions when the software is loaded onto the respective device or devices and executed on one or more processing engines such as microprocessors, ASIC's, FPGA's etc.:

predicting chroma values making use of a decoder, and an up-sample filter, having the decoder providing an image frame to the up-sample filter, said image frame comprising luma and chroma components, having the up-sampling filter defining a subset of said image frame, and applying at least one analysing algorithm on said subset to obtain the subset content type, and selecting at least one reconstruction algorithm to reconstruct the chroma components of the subset wherein the selection of the at least one reconstruction algorithm depends on the subset content type, the smallest size of the subset being 2 by 2 pixels in full chroma resolution.

The software can be embodied in a computer program product adapted to carry out the following functions when the software is loaded onto the respective device or devices

TABLE II

| (a) | | | | (b) | | | |
|---|---|---|---|---|---|---|---|
| | PSNR-chroma [dB] | | | | SSIM-chroma | | |
| Sequence | Anchor | Proposal | Gain | Sequence | Anchor | Proposal | Gain |
| cad-waveform | 23.04 | 26.14 | 3.10 | cad-waveform | 0.796 | 0.923 | 0.28 |
| pcb-layout | 26.27 | 28.57 | 2.30 | pcb-layout | 0.845 | 0.924 | 0.079 |
| ppt-doc | 31.25 | 31.89 | 0.64 | ppt-doc | 0.911 | 0.927 | 0.016 |
| twist-tunnel | 36.45 | 38.27 | 1.82 | twist-tunnel | 0.984 | 0.989 | 0.005 |
| video-conferencing | 29.85 | 30.36 | 0.51 | video-conferencing | 0.877 | 0.904 | 0.027 |
| Average | | | 1.67 | Average | | | 0.051 |
| CrowdRun | 37.18 | 37.17 | −0.01 | CrowdRun | 0.913 | 0.913 | −0.001 |
| BirdsInCage | 39.13 | 38.84 | −0.29 | BirdsInCage | 0.932 | 0.925 | −0.007 |
| Kimono | 40.38 | 40.26 | −0.12 | Kimono | 0.939 | 0.937 | −0.002 |
| ParkScene | 38.05 | 38.02 | −0.03 | ParkScene | 0.917 | 0.916 | −0.001 |
| Traffic | 41.85 | 41.59 | −0.26 | Traffic | 0.973 | 0.969 | −0.004 |
| Average | | | −0.14 | Average | | | −0.003 |

Figure 6:
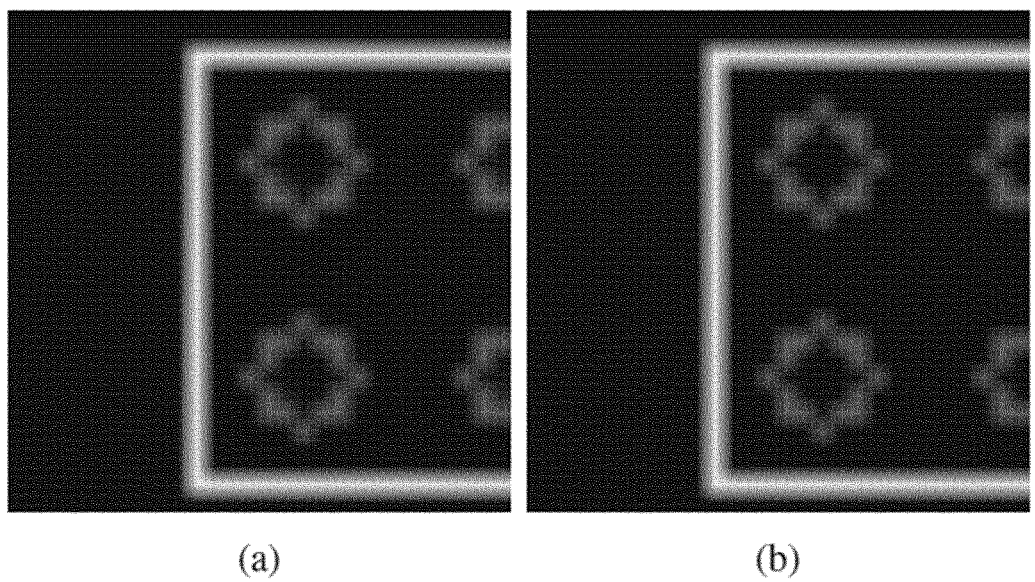
FIG. 6 shows a detail of a chroma reconstructed image made by a) a conventional method and b) an embodiment of the present invention.

FIG. 6 demonstrates the reconstruction of a pct-layout sequence obtained by a) anchor and b) proposal. The proposal shows a perfect reconstruction, while the anchor provides a smoothed output with less detail. For natural content, the results range from 0.01 dB loss for the CrowdRun sequence to a loss of 0.29 dB for the BirdsInCage sequence. The average loss of SSIM-chroma for the natural content sequences is 0.003. For the tested sequences is this loss rather negligible, so there is no need for algorithms that classify content to decide whether to activate the proposed upscaling filter or not, which is a considerable advantage.

and executed on one or more processing engines such as microprocessors, ASIC's, FPGA's etc.:

decoding with a hardware accelerated decoder, and/or reconstructing the chroma components with the values of the luma components, and/or an analysing algorithm comprising the step of investigating if at least two luma components in the above mentioned subset have the same value.

The software can be embodied in a computer program product adapted to carry out the following functions when the software is loaded onto the respective device or devices and executed on one or more processing engines such as microprocessors, ASIC's, FPGA's etc.:

an analysing algorithm comprising the step of investigating if the chroma subset have the same or substantially the same structure, or the same or substantially the inverse structure, of the luma subset, and/or the reconstruction algorithm comprising the steps of implementing the formulas of an up-sampling algorithm wherein, for neighbouring luma components being equal, arranging the corresponding chroma components to be equal.

The software can be embodied in a computer program product adapted to carry out the following functions when the software is loaded onto the respective device or devices and executed on one or more processing engines such as microprocessors, ASIC's, FPGA's etc.: a reconstruction algorithm comprising the steps of, normalizing the full-resolution luma component with the minimum and maximum sub-sampled luma component, and linearly scale it to the sub-sampled chroma component, and/or the position of the above mentioned subset is repeatedly moved so that eventually the whole frame is being analysed and reconstructed.

Any of the above software may be implemented as a computer program product which has been compiled for a processing engine in the decoder. The computer program product may be stored on a non-transitory signal storage medium such as an optical disk (CD-ROM or DVD-ROM), a digital magnetic tape, a magnetic disk, a solid state memory such as a USB flash memory, a ROM, etc.

REFERENCES

[1] Apple, "Apple—ipad air—technical specifications," https://www.apple.com/ipad-air/specs/, 2014, [Online; accessed 19 Aug. 2014].

[2] Google, "Supported media formats, android developers," http://developer.android.com/guide/appendix/media-formats.html, 2014, [Online; accessed 19 Aug. 2014].

[3] G. J. Sullivan, J.-R. Ohm, W.-J. Han, and T. Wiegand, "Overview of the high efficiency video coding (HEVC) standard," Circuits and Systems for Video Technology, IEEE Transactions on, vol. 22, no. 12, pp. 1649-1668, 2012.

[4] Y. Itoh and T. Ono, "Up-sampling of YCbCr 4:2:0 image exploiting inter-color correlation in rgb domain," Consumer Electronics, IEEE Transactions on, vol. 55, no. 4, pp. 2204-2210, November 2009.

[5] M. Zhao, P. M. Hofman, and G. de Haan, "Content-adaptive upscaling of chrominance using classification of luminance and chrominance data," in Electronic Imaging 2004. International Society for Optics and Photonics, 2004, pp. 721-730.

[6] K. He, J. Sun, and X. Tang, "Guided image filtering," IEEE Transactions on Pattern Analysis and Machine Intelligence, vol. 35, no. 6, pp. 1397-1409, 2013.

[7] Zhou Wang, A. C. Bovik, H. R. Sheikh, and E. P. Simoncelli, "Image quality assessment: from error visibility to structural similarity," Image Processing, IEEE Transactions on, vol. 13, no. 4, pp. 600-612, April 2004.

The invention claimed is:

1. A method for predicting chroma values using a decoder, and an up-sample filter, comprising the steps of:

having the decoder provide an image frame to the up-sample filter, said image frame comprising luma and chroma components, having the up-sampling filter define a subset of said image frame, and applying at least one analysing algorithm on said subset to obtain a subset content type, and selecting at least one reconstruction algorithm to reconstruct the chroma components of the subset wherein the selecting of the at least one reconstruction algorithm depends on the subset content type, and wherein a size of the subset is at least 2 by 2 pixels in full chroma resolution, wherein the at least one analysing algorithm comprises the step of investigating if the chroma subset has the same or substantially the same structure, or the same or substantially the inverse structure, of the luma subset.

2. A method according to claim 1, wherein the decoder is a hardware accelerated decoder.

3. A method according to claim 1, wherein the chroma components are reconstructed with the values of the luma components.

4. A method according to claim 1, wherein an analysing algorithm comprises the step of investigating if at least two luma components in the subset have the same value.

5. A method according to claim 1, wherein the reconstruction algorithm comprises the steps of implementing formulas of an up-sampling algorithm wherein, and for neighboring luma components being equal, arranging the corresponding chroma components to be equal.

6. A method according to claim 1, wherein a reconstruction algorithm comprises the steps of, normalizing the full-resolution luma component with a minimum and maximum sub-sampled luma component, and linearly scaling it to the sub-sampled chroma component.

7. A method according to claim 1, wherein a position of the subset is repeatedly moved so that eventually the whole image frame is analysed and reconstructed.

8. An apparatus for predicting chroma values, comprising:

a decoder arranged to receive and provide an image frame, said image frame comprising luma and chroma components, and an up-sampling unit, comprising an up-sampling filter performing reconstruction, arranged to receive image frames from the decoder and defining at least one subset of each image frame, wherein for each subset of the image frame, said up-sampling unit is configured to select at least one reconstruction algorithm to reconstruct the chroma components of the subset so that the selected reconstruction algorithm depends on a content type of the subset, wherein a size of the subset is at least 2 by 2 pixels in full chroma resolution, further comprising analysing algorithm means adapted to investigate if the chroma subset has the same or substantially the same structure, or the inverse structure or substantially the inverse structure, of the luma subset.

9. The apparatus according to claim 8, wherein the decoder is a hardware accelerated decoder.

10. The apparatus according to claim 8, a wherein the upsampling unit is adapted to reconstruct the chroma components with the values of the luma components.

11. The apparatus according to claim 8, further comprising analysing algorithm means adapted to investigate if at least two luma components in the subset have the same value.

12. The apparatus according to claim 8, wherein the reconstruction algorithm is adapted to implement the formulas of an up-sampling algorithm wherein, for neighbouring luma components being equal, the corresponding chroma components are arranged to be equal.

13. The apparatus according to claim 8, wherein the up-sampling filter for performing reconstruction is adapted to normalize the full-resolution luma component with the minimum and maximum sub-sampled luma component, and linearly to scale it to the sub-sampled chroma component.

14. The apparatus according to claim 8, wherein the apparatus is further adapted so that the above-mentioned subset can be placed in a multiple of positions, said multiple of positions being located so that eventually the whole frame can be analysed and reconstructed.

15. A computer program product comprising a non-transitory machine-readable medium carrying instructions which, when executed by a processor, cause the processor to perform the method of claim 1.

16. The method according to claim 1, wherein the subset content type is identified as natural screen content or synthetic screen content.

17. A method for predicting chroma values using a decoder, and an up-sample filter, comprising the steps of:
  having the decoder provide an image frame to the up-sample filter, said image frame comprising luma and chroma components,
  having the up-sampling filter define a subset of said image frame, and applying at least one analysing algorithm on said subset to obtain a subset content type, and
  selecting at least one reconstruction algorithm to reconstruct the chroma components of the subset wherein the selecting of the at least one reconstruction algorithm depends on the subset content type, and wherein a size of the subset is at least 2 by 2 pixels in full chroma resolution,
  wherein the reconstruction algorithm comprises the steps of:
  implementing formulas of an up-sampling algorithm wherein, and for neighboring luma components being equal, arranging the corresponding chroma components to be equal, or
  normalizing the full-resolution luma component with a minimum and maximum sub-sampled luma component, and linearly scaling it to the sub-sampled chroma component.

18. The method according to claim 17, wherein the decoder is a hardware accelerated decoder.

19. The method according to claim 17, wherein the chroma components are reconstructed with the values of the luma components.

20. The method according to claim 17, wherein an analysing algorithm comprises the step of investigating if at least two luma components in the subset have the same value.

* * * * *